(No Model.)
M. H. KERNER.
ELECTRIC BURGLAR ALARM.
No. 254,336. Patented Feb. 28, 1882.
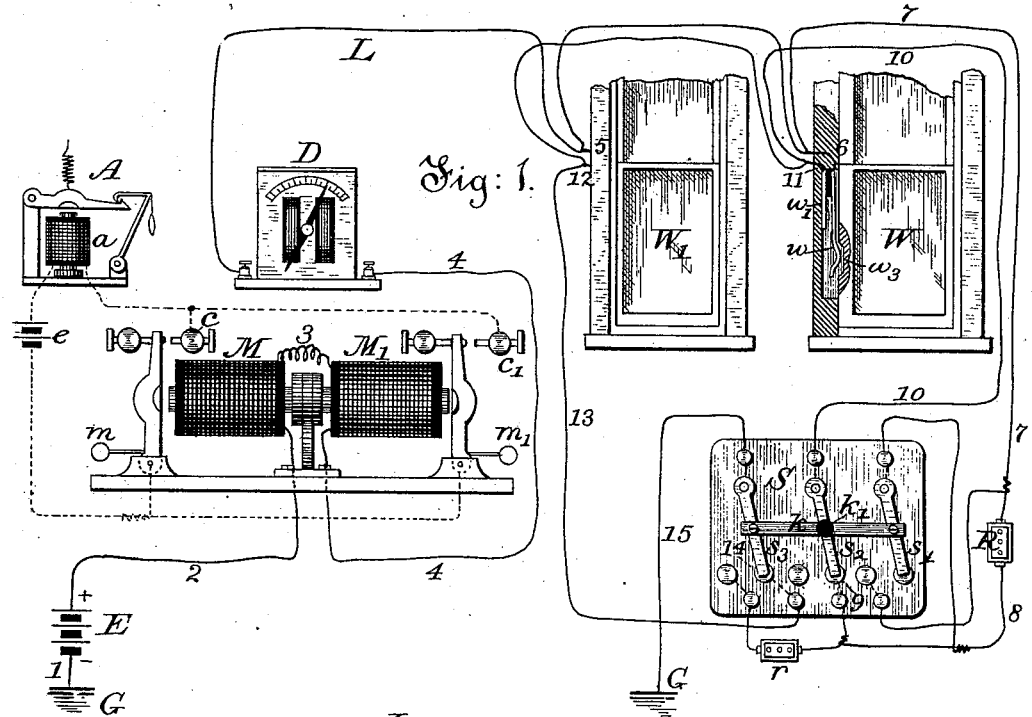
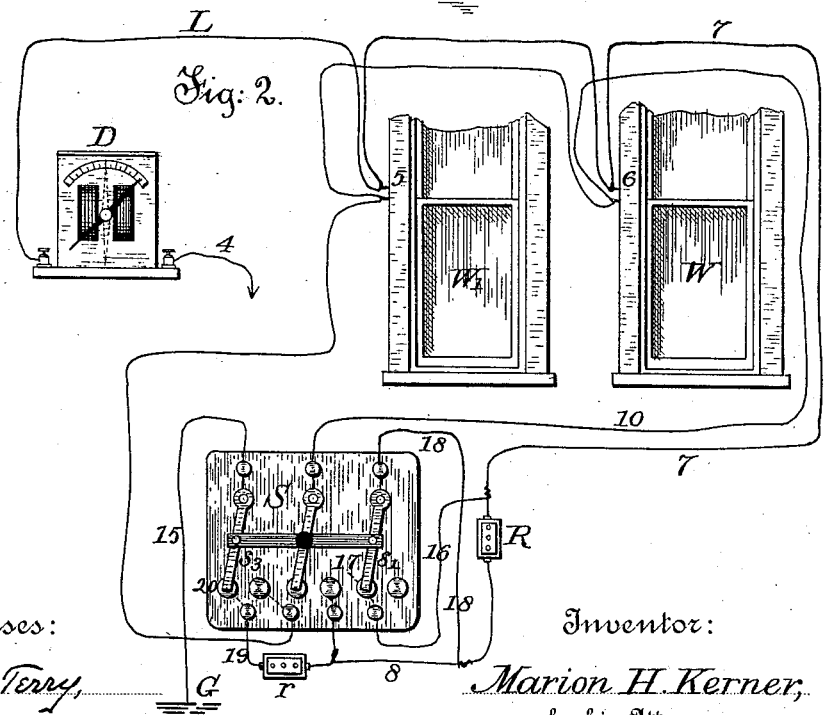
Witnesses:
Charles A. Terry,
Miller C. Earl
Inventor:
Marion H. Kerner,
by his Attorney,
Frank L. Pope.

UNITED STATES PATENT OFFICE.

MARION H. KERNER, OF NEW YORK, N. Y.

ELECTRIC BURGLAR-ALARM.

SPECIFICATION forming part of Letters Patent No. 254,336, dated February 28, 1882.

Application filed January 9, 1882. (No model.)

*To all whom it may concern:*

Be it known that I, MARION H. KERNER, a citizen of the United States, residing at New York, in the county and State of New York, have invented certain new and useful Improvements in Electric Burglar-Alarms, of which the following is a specification.

My invention relates more especially to that class of electric burglar-alarms in which a normally-closed electric circuit extends through the building, safe, vault, or other structure which is required to be protected from unauthorized entrance, and which circuit is also connected with a station, where an operator, watchman, or other proper attendant remains constantly on duty, so that the opening of a window or door, or the effecting of an entrance in any manner into any part of the protected structure by an unauthorized person, will cause the strength of an electric current traversing the closed circuit to be either increased or diminished, so as to instantly produce a signal or alarm at the station, and thus notify the attendant.

The object of my invention is to furnish an apparatus which is more certain in its operation and more easily maintained in proper working condition than the apparatus heretofore employed for this purpose, and, moreover, to provide means whereby the circuit is subjected to a continuous test, so that by the aid of suitable indicating apparatus at the principal station the exact condition of the entire system may be known by inspection at any moment, either during the day or night, so that in case of any interference or interruption immediate measures may be taken to remedy the same.

In the accompanying drawings, Figure 1 is a diagram representing the organization of the electric circuits and apparatus of a single protective circuit embodying my invention, and which shows the apparatus as arranged in position for night service; and Fig. 2 shows the same in the proper position for day service.

Referring to Fig. 1, E represents the main battery at the central station, one pole of which is connected to the earth at G by the wire 1. From the other pole of the battery a wire, 2, extends to the electro-magnet of a relay, M, and thence the circuit may be traced by the wire 3 to the electro-magnet of the relay M', thence by the wire 4 to a detecter or indicator, D, for showing the strength of current in the circuit, (herein shown as an ordinary galvanometer of well-known construction,) after passing through the coils of which the circuit extends by the line L to a greater or less distance, and enters the building to be protected, as hereinafter explained.

I have shown in the drawings the protective appliances as attached to two windows, W and W', in order to illustrate the organization and operation of the system; but I remark that protective appliances of like or equivalent construction may also be attached to doors, scuttles, safes, and vaults, or to any structure or a portion of a structure which may for any reason require such protection.

The attachment may consist of any suitable circuit-closer or contact-maker, one form of which I have shown in the drawings, consisting of a metallic spring, $w$, which is mounted within a suitable cavity formed in the window-frame, and which is bent so as to normally project into a slot, $w^3$, cut in the edge of the sash. If an attempt is made to raise the sash, the spring $w$ is forced into contact with a metallic plate, $w'$, normally insulated therefrom, and an electric contact is formed between them. The line L, after entering the building to be protected, is conducted successively to each window, door, or other point to be guarded, and at each of these places is electrically connected with the insulated spring $w$—as shown, for example, at 5 and 6—after which it is continued by the wire 7 to a rheostat or artificial resistance, R, and from thence by wire 8 to a switch-board, S, which is located in some convenient place within the protected building.

The switch-board S is provided with three metallic switch-levers, $s'$, $s^2$, and $s^3$, which are mounted parallel to each other upon a suitable base of insulating material, and are mechanically linked together by a non-conducting bar, $k$, which may be provided with a handle or knob, $k'$, for convenience in moving the several levers simultaneously. When the circuits are arranged for night service the switch-levers are placed in the position shown in Fig. 1, and the course of the circuit may then be traced from the wire 8 to the stud 9, and thence by switch-lever $s^2$ and wire 10 to the contact-points $w'$ of windows W and W' in succession, as shown at 11 and 12; thence by wire 13, stud 14, switch-lever $s^3$, and wire 15 to the earth at G. When the apparatus is in this position a constant current of electricity from the battery E will traverse the entire circuit, passing through the coils of the relays M and M', and also through the coil of the detecter D and through the rheostat R, as shown by the arrow-heads in Fig. 1. The resistance of the rheostat R may with advantage be made equal to or even considerably greater than that of the remainder of the circuit, including the conducting-wires, relays, and detecter.

The armature of the relay M' is provided with a suitable counter-balance, $m'$, the weight of which is almost sufficient to overcome the attraction of the electro-magnet, due to the normal strength of current, so that any interruption or diminution thereof will cause the armature, under the influence of the counter-balance, to fall back on its rear contact-stop, $c'$. The relay M is also provided with a similar counter-balance, $m$, which is of sufficient weight to retain the armature against its back stop in opposition to the attraction of the electro-magnet under the influence of the normal current.

In order to insure greater certainty and reliability in the action of the relays M and M', I prefer to construct the coils of the electro-magnet of the relay M' of thinner wire, and thereby to cause them to contain a much greater number of convolutions than the coils of the other relay, M. In consequence of this arrangement, an electric current of given strength traversing the coils of both magnets will produce a much greater magnetic effect upon the cores of the relay M' than upon the cores of the relay M, and hence it will require comparatively little weight in the counter-balance $m$ to overcome the normal attraction of its electro-magnet.

A represents a signaling apparatus, which may be of any suitable character. I have shown a form well adapted for the purpose, consisting of an ordinary drop annunciator or visual signal, which is actuated by an electro-magnet, $a$. This electro-magnet is included in the circuit of a local battery, $e$, (shown in dotted lines,) which is connected to the front contact-stop, $c$, of relay M and to the back contact-stop, $c'$, of relay M', and also to the armature-levers of both relays. The circuit of the local battery $e$ will therefore be closed and the signaling apparatus A set in action whenever the armature of the relay M is brought in contact with its front contact-stop, $c$, and the armature of the relay M' with its rear contact-stop, $c'$.

The operation of the apparatus is as follows: In case an attempt is made by any person to effect an entrance into the protected structure—as, for example, by raising the window W—an electric contact will be formed between the springs $w$ and $w'$, which will shunt the rheostat R, and thereby remove its resistance from the circuit. The effect of this decrease in the total resistance of the circuit will be to increase the strength of current in the line L to nearly double its normal amount, which abnormal strength of current will instantly be indicated at the central office, not only by the increased angle of deflection of the detecter D, but by the action of the signaling apparatus A also, inasmuch as the augmented strength of the current traversing the relay M will overcome the gravity of the weight $m$, and by its armature-lever close the local circuit of battery $e$ at the stop $c$.

If any attempt should be made to enter the building unperceived by first severing the conducting-wire at any point, a similar effect will be produced at the central station. The circuit of the line L being entirely interrupted, the needle of the detecter or indicator will fall back to zero, and the armatures of both relays M and M' will fall on their back contact-stops, while the contact of the armature of the relay M' with the stop $c'$ will close the circuit of the local battery $e$ and cause the signaling apparatus A to be operated with the same effect as in the first case.

During that portion of the day that a protected building, such as a bank or mercantile establishment, is open for the ordinary transaction of business, it is desirable to disconnect or render inoperative the devices within the building by means of which the alarm is transmitted to the central office; but it is nevertheless important that the attendant at the central station should at all times during the day or night be advised of the electrical condition of the circuits, and should also be able to ascertain from an inspection of his apparatus whether or not the protected building is occupied or opened for business. To this end I provide for day service an auxiliary system of circuits within the protected building, which is brought into action by some authorized person within the building, who at the proper hour changes the position of the levers upon the switch S, placing them in the position shown in Fig. 2. When the switch is in this position the rheostat R is shunted or cut out of circuit and an independent rheostat, $r$, of a different and preferably of a smaller resistance is inserted in its place. The course of the circuit, as denoted by the arrow-heads in Fig. 2, may now be traced as follows: from the line L, as before, to the points 5 and 6, thence by wires 7 and 16 to stud 17, thence by switch-lever $s'$ and wires 18 and 8 to rheostat $r$, and thence by the wire 19 to the stud 20, and through switch-lever $s^3$ and wire 15 to the earth at G. The effect of this change is to permit the windows W and W' or other protected openings to be entered without affecting the resistance of the line, and also to substitute the resistance of the rheostat $r$ for that of the rheostat R in the main circuit, which produces a change in the strength of the current and a corresponding indication upon the detecter D. Thus by a mere inspection of the detecter D, which indicates the strength of current traversing the line L, the attendant at the central office can determine at any moment which one of the two rheostats R and $r$ is in circuit, and can thus know whether the protected building is open or closed. The changing of the switch S from one position to the other momentarily breaks the main circuit, and by so doing actuates the signaling apparatus A, thus giving notice at the central station at the moment the change is effected. The switch S may be placed in a locked compartment, and thus rendered inaccessible to any other person than the one authorized to take charge of it.

I do not desire to confine myself to the particular form of detecter or indicator which I have shown in the drawings, as any device which will measure the strength of an electric current traversing a circuit can be made to serve the same purpose. So, also, the signaling apparatus A may consist either of a visual or an audible signal, or of both. Nor do I restrict myself to any special device for closing a shunt-circuit by the moving of a door, window, or other object, as any well-known or proper mechanism for that purpose may be used in connection with my invention.

I claim as my invention—

1. The combination, substantially as hereinbefore set forth, of a main line, a main battery, one or more circuit-closers adapted to shunt a portion of the main line, two independent relays included in the main-line circuit, one of which responds to an increase and the other to a decrease in the normal strength of the current traversing said main line, and a signaling apparatus included in an independent local circuit and capable of being actuated by either of said relays.

2. The combination, substantially as hereinbefore set forth, of a main line, a main battery, a rheostat included in the main-line circuit, one or more circuit-closers adapted to shunt the portion of said main line including said rheostat, two relays included in the main-line circuit, one of which responds to an increase and the other to a decrease in the normal strength of the current traversing said main line, and a signaling apparatus included in an independent local circuit and capable of being actuated by either of said relays.

3. The combination, substantially as hereinbefore set forth, of a main line, a main battery, a rheostat included in the main-line circuit, one or more circuit-closers adapted to shunt the portion of the main line including said rheostat, a second rheostat placed in a branch circuit and having a resistance either greater or less than that of the first rheostat, a switch for disconnecting the main line from one rheostat and connecting it with the other, and a detecter for indicating the strength of current traversing the main line.

4. The combination, substantially as hereinbefore set forth, of a main line, a main battery, a rheostat included in the main-line circuit, one or more circuit-closers adapted to shunt the portion of the main line including said rheostat, a second rheostat having a resistance greater or less than that of the first one and placed in a branch line, a switch for disconnecting the main line from one rheostat and connecting it with the other, a detecter for indicating the strength of current in the main-line circuit, two relays included in the main-line circuit, one of which responds to an increase and the other to a decrease in the normal strength of the current traversing said main line, and a signaling apparatus under the control of either of said relays.

5. The combination, substantially as hereinbefore set forth, of a main line, a main battery, two rheostats, one or more circuit-closers adapted to shunt one of said rheostats and not the other, and a switch whereby the resistance of either one of said rheostats may be removed from the main circuit at pleasure, but not both at the same time.

6. The combination, substantially as hereinbefore set forth, of a main line, a main battery, two relays included in the main-line circuit, one of which, having a lesser number of convolutions, responds to an increase, and the other, having a greater number of convolutions, responds to a decrease, in the normal strength of the current traversing said main line, and a signaling apparatus under the control of either of said relays.

In testimony whereof I have hereunto subscribed my name this 31st day of December, A. D. 1881.

MARION H. KERNER.

Witnesses:
MILLER C. EARL,
WILLIAM H. KENYON.